(12) United States Patent
Algranati (10) Patent No.: US 8,341,009 B1
(45) Date of Patent: Dec. 25, 2012

(54) INFORMATION MODELING AND PROJECTION FOR GEOGRAPHIC REGIONS HAVING INSUFFICIENT SAMPLE SIZE

(75) Inventor: David Algranati, Delray Beach, FL (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 1936 days.

(21) Appl. No.: 11/018,976

(22) Filed: Dec. 21, 2004

Related U.S. Application Data (60) Provisional application No. 60/532,659, filed on Dec. 23, 2003.

(51) Int. Cl.
*G06Q 30/00* (2006.01)

(52) U.S. Cl. .................. 705/7.32; 705/7.29; 705/7.33; 705/7.34; 705/14.44; 705/14.57

(58) Field of Classification Search .............. 705/8, 9, 705/7.11–7.42
See application file for complete search history.

(56) References Cited

U.S. PATENT DOCUMENTS

| | | | | |
|---|---|---|---|---|
| 3,936,667 A | * | 2/1976 | Loubal | 705/8 |
| 6,975,999 B2 | * | 12/2005 | Moore | 705/9 |
| 7,752,069 B1 | * | 7/2010 | Bailey | 705/7.35 |
| 2005/0055275 A1 | * | 3/2005 | Newman et al. | 705/14 |

* cited by examiner

*Primary Examiner* — David Rines
(74) *Attorney, Agent, or Firm* — Nancy R. Gamburd; Gamburd Law Group LLC (57) ABSTRACT

The various exemplary embodiments provide a method for projecting survey information into a geographic region. The geographic region is divided into a plurality of geographic subregions, each of which are profiled using a plurality of profiling variables to form a selected geographic subregion profile. The profiling variables include both demographic and behavioral variables. A plurality of survey respondents are then randomly assigned into the selected geographic subregion to form a modeled population, with the random assignment weighted based on a representation probability of each of the corresponding plurality of survey respondents for the selected geographic subregion profile, with the representation probabilities having been determined using a sample balancing algorithm. Following such profiling and assignment for all subregions, survey information corresponding to the modeled population is projected into the geographic region.

40 Claims, 6 Drawing Sheets

INFORMATION MODELING AND PROJECTION FOR GEOGRAPHIC REGIONS HAVING INSUFFICIENT SAMPLE SIZE

CROSS-REFERENCE TO RELATED APPLICATION

This application is related to and claims priority to U.S. Provisional Patent Application Ser. No. 60/532,659, filed Dec. 23, 2003, inventor David Algranati, entitled "System and Method for Targeting and Profiling Consumers and Audiences", the contents of which are incorporated herein by reference, commonly assigned herewith, with priority claimed for all commonly disclosed subject matter.

FIELD OF THE INVENTION

The present invention relates, in general, to database management systems and, more particularly, to a system, method and software, using a data repository such as a database, for modeling and projecting demographic, attitudinal and behavioral information into a geographic region, to support statistical inferences, where the region would otherwise having an insufficient sample size for supporting such inferences.

BACKGROUND OF THE INVENTION

Many organizations utilize demographic, and geographically-based demographic information, for a wide variety of purposes. For example, the United States conducts a constitutionally mandated, geographically-based census survey every ten years for purposes of readjusting governmental and political representation districts. Demographic information available from the census includes age, gender, ethnicity, race, income, education, etc. The census is conducted within each state plus the District of Columbia, with information provided at a comparatively fine-grained level, with the U.S. geographically divided into over 3,000 counties, which are further geographically subdivided into over 65,000 census tracts, which are further geographically subdivided into over 208,000 census block groups, and which are further geographically subdivided into over 8,200,000 census blocks.

Based on the notion that demographics are often skewed by geographies, such as wealthy neighborhoods and ethnic neighborhoods, "geo-demographics" have often been utilized to target or preferentially communicate with certain groups, such as for political and marketing communications. In other circumstances, governmental and business decisions are based on such geo-demographics, such as decisions for locating a new post office, a new dealership, a new shopping center or store, and so on. In addition, for certain industries, such as the broadcast and print media, their usage is specifically skewed by such geo-demographic "segments", as such media may only have applicability for certain demographic groups within certain defined geographies.

As a consequence, geo-demographic "clustering" has evolved as a way to try to identify and describe groups of individuals based upon their demographic characteristics. Certain regions are then defined by the corresponding demographic clusters contained in that region. While certainly better than "blind" targeting or analysis by at least providing some differentiation (or discriminatory) capability, such clustering techniques do not provide other significant information, such as behavioral and attitudinal information. ("Discriminatory", as used herein, should be utilized in a statistical sense, to provide differentiation on the basis of certain common characteristics, such as differentiating people based upon their age groups or educational levels.)

In addition, such clustering techniques tend to be either under inclusive or over inclusive. For example, such clustering is under inclusive, as small but significant groups of people in certain regions may be omitted from analysis altogether, as not falling within the major cluster groups for those regions. As a consequence, such clustering systems lose population nuances and minority influences, which may, in fact, be significant. For example, current clustering techniques from a wide variety of companies would group Hispanic individuals of Dominican Republic origin into a cluster residing in large cities; actual analysis would reveal, however, that many of these cities having such a "large city cluster" do not, in fact, have any significant population of such Hispanic individuals of Dominican Republic origin.

The over inclusiveness of such clustering groups is also well-known. Groups of individuals with very different behaviors and attitudes, for example, may be grouped together. For example, a young or middle-aged statistician with a doctoral level education, who happens to live in Florida, may, by virtue of his residence, be included within a cluster of retired individuals. Because of such over inclusiveness, nuances and minority information of certain regions and neighborhoods are lost in these forms of cluster analysis.

As a consequence, a need remains for other forms of analysis, which not only provide geo-demographic information, but which also provide important behavioral (e.g., what people say and do) and attitudinal (e.g., beliefs, outlooks, psychographics) information. Such an analytical system should have a firm foundation in empirical research, such as through the use of statistically significant or relevant surveys from a nationally represented sample of individuals.

Such systems and methods should be fine-grained, and should accurately preserve behavioral nuances and minority information. Such methods and systems should have the capability to model all regions and their subregions, even those that have an insufficient sample size within nationally representative surveys.

SUMMARY OF THE INVENTION

The various embodiments of the present invention provide a modeled population of a selected geographic region, based upon respondents of one or more nationally representative surveys, having not only demographic information, but also behavioral and attitudinal information. As a consequence, using a modeled population, this additional information is available to be projected into a selected geographic region, such that the selected geographic region now has a wealth of information, including nuanced and minority information, which may be utilized to draw statistical inferences. Without the various embodiments of the present invention, such a geographic region would otherwise have an insufficient sample size to legitimately support such statistical analyses. In addition, the present invention provides for additional data transformation, thereby providing the capability for regional comparisons. In accordance with the present invention, therefore, nationally representative survey results may be projected into various regions and subregions, accurately, and without any need for conducting separate surveys in these regions and subregions.

As mentioned above, the various embodiments of the present invention preserve nuances and minority representation, such as minority representation based on race, ethnicity, political outlook, education, purchase behavior, etc. In contrast, prior art clustering and/or segmentation methods lose this subtle but valuable information, as such minority populations are not included in the assigned clusters. In accordance with the exemplary embodiments, the present invention preserves the full spectrum of information representative of geographic region and their corresponding subregions, providing fine-grained detail for a vast amount of information. As a consequence, the methodology of the invention provides a considerably more accurate and representative modeling of regions, compared to prior art methods.

The various embodiments provide a method, system and software for projecting survey information into a geographic region, in which the geographic region may be further subdivided into a plurality of geographic subregions. The exemplary method embodiment comprises, first, profiling a selected geographic subregion of the plurality of geographic subregions using a plurality of profiling variables to form a selected geographic subregion profile; and second, randomly assigning a plurality of survey respondents into the selected geographic subregion to form a modeled population, the random assignment weighted based on a representation probability of each of the corresponding plurality of survey respondents for the selected geographic subregion profile. Such a representation probability is a likelihood of an individual being representative of members of the population of the selected subregion. These profiling and random assignment steps are repeated for all geographic subregions of the plurality of geographic subregions. The survey information is then projected into the geographic region, with the projected survey information corresponding to the modeled population.

In the exemplary embodiments, the plurality of profiling variables comprise a plurality of demographic variables and a plurality of behavioral variables, and may also include a plurality of historical or synthetic variables.

The profiling generally comprises determining a first portion of the selected geographic subregion profile based upon demographic variables determined for the selected geographic subregion. The profiling then includes assigning a first plurality of resident survey respondents to the selected geographic subregion; assigning a second plurality of non-resident survey respondents to the selected geographic subregion, the second plurality of non-resident survey respondents resident in a plurality of neighboring geographic subregions; and determining a second portion of the selected geographic subregion profile as a weighted average of a corresponding pluralities of profiling variables of the first plurality of resident survey respondents and second plurality of non-resident survey respondents. The corresponding pluralities of profiling variables of the second plurality of non-resident survey respondents are each weighted inversely proportionally to a distance of a non-resident survey respondent from the selected geographic subregion.

In addition, the selected geographic subregion profile is further determined by normalizing the weighted average of corresponding pluralities of profiling variables based on independent data for the selected geographic subregion or geographic region.

In the selected embodiments, the random assignment further comprises determining each representation probability of each of the corresponding plurality of survey respondents by applying a sample balancing algorithm to corresponding pluralities of profiling variables of all survey respondents in comparison to the selected geographic subregion profile. The corresponding pluralities of profiling variables of all survey respondents further comprise a temporal weighting, such that the modeled population is currently accurate. In addition, the assignment step may further include deterministically assigning all resident survey respondents to the modeled population of the selected geographic subregion.

The projected survey information may also include transformed data for regional comparison. Typically, the projected survey information comprises nationally representative survey information pertaining to one or more of the following types of information: brand usage, age, gender, household income, race, ethnicity, political outlook, education, purchase behavior, media consumption, vehicle information, transportation information, and financial information.

The method, system and software embodiments may also output a data structure, containing both "in-tab" information, such as the number of respondents placed within a region or subregion, and "cross-tab" information, such as a display of a correlation or other relationship between one or more variables.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which.

DETAILED DESCRIPTION OF THE INVENTION

While the present invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated.

As discussed above, the various embodiments of the present invention provide a means for nationally representative survey results to be projected into various regions and subregions, accurately, and without any need for conducting separate surveys in these regions and subregions. The various embodiments provide for accurate modeling of geographic regions which would otherwise have an insufficient sample size to support statistical inferences. The present invention provides a modeled population of a selected geographic region, based upon respondents of one or more nationally representative surveys, having not only demographic information, but also behavioral and attitudinal information. In addition, the various embodiments preserve nuances and minority representation, such as minority representation based on race, ethnicity, political outlook, education, purchase behavior, and so on, providing highly detailed and fine-grained information for any selected geographic region and its corresponding subregions. The various embodiments also reflect other nuances, such as cultural, legal, moral and economic variations between and among these different regions.

Figure 1:
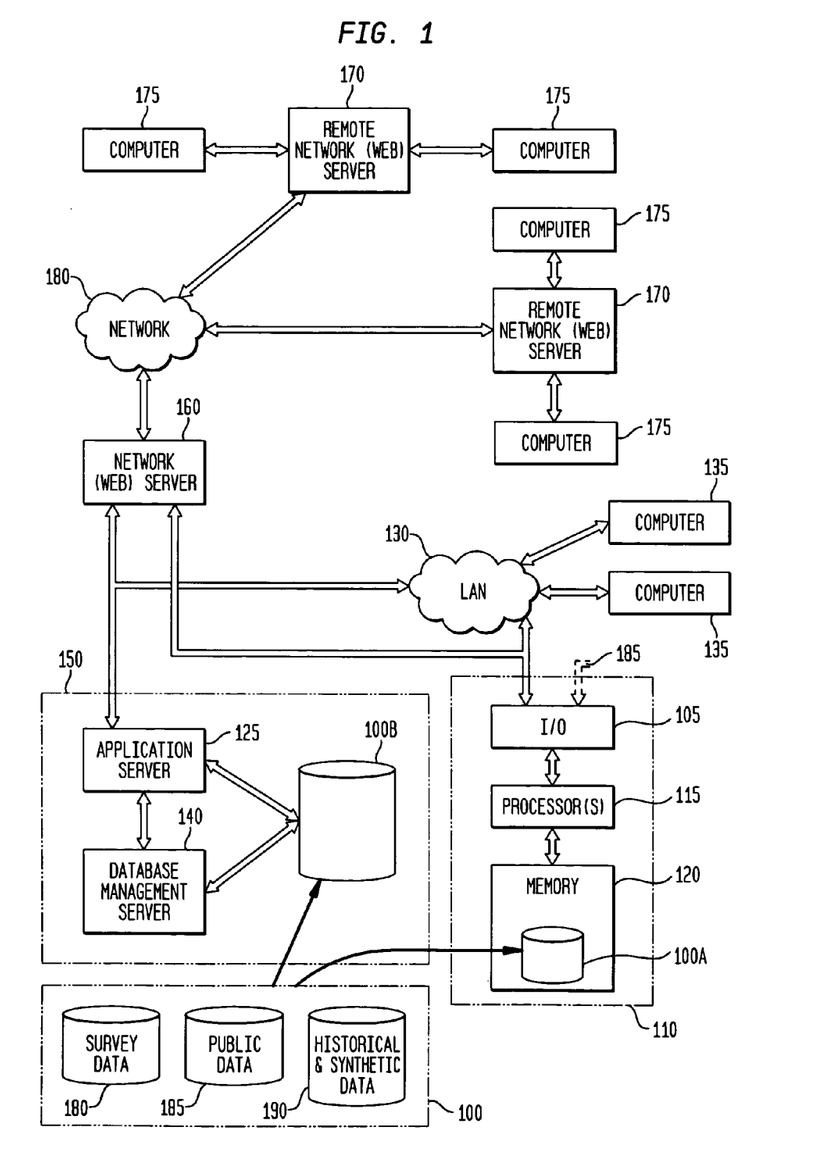
FIG. 1 (or "FIG. 1") is a block diagram illustrating first and second exemplary system embodiments in accordance with the teachings of the present invention.

FIG. 1 is a block diagram illustrating first exemplary system embodiment 110 and second exemplary system embodiment 150 in accordance with the present invention. Such one or more systems 110 and 150 may be programmed or configured with the software, instructions or configuration information in accordance with the teachings of the present invention, to perform the in accordance with the teachings of the present invention. As illustrated in FIG. 1, the first exemplary system embodiment 110 is a computer system embodiment (e.g., a mainframe computer, a personal computer, a computer workstation, or any other computer having processing power sufficient to support the exemplary method discussed below), comprising an input and output (I/O) interface 105, one or more processors 115, and a memory 120 storing one or more databases (or data repositories) 100A. The memory 120 may be external, such as an external magnetic disk, tape, or optical drive, or may be internal, such as random access memory, cache memory, and so on. The second system 150, such as an open or network system, comprises one or more data repositories (or databases) 100B (also embodied in a form of memory, discussed below), a database management server 140, and/or an application server 125. A "data repository", "database", and "data warehouse", as used herein, are considered interchangeable, and may be relational, object-oriented, object-relational, or use files or flat files, or any combinations of the above. Both database 100A and 100B are instantiations of one or more databases 100, discussed in greater detail below.

In the exemplary embodiments of system 150, the database management server 140 and the application server 125 may be implemented together, such as implemented within the application server 125. Either or both of the database management server 140 and the application server 125 are connected or coupled (or couplable) to the one or more data repositories (or databases) 100B, for full duplex communication, such as for database queries, database file or record transfers, database updates, and other forms of database communication. In the second system embodiment 150, the database management server 140 and/or the application server 125 perform the methodology of the invention utilizing a correspondingly programmed or configured processor as discussed below (not separately illustrated), such as a processor 115 illustrated for system 110, in conjunction with one or more databases 100 (such as one or more databases 100B).

Typically, the databases 100A and 100B are ODBC-compliant (Open Database Connectivity), although this is not required for the present invention. The first system 110 and second system 150 may also be coupled to or may be part of a local area network ("LAN") 130 or, not separately illustrated, a wide area network ("WAN"), such as for full duplex communication with a plurality of computers (or other terminals) 135, also for database queries, database file or record transfers, database updates, and other forms of database communication. The LAN 130 communication capability provides for the first system 110 and second system 150 to be accessible for local access to the databases 100A and 100B, such as for large file transfers or other batch processing, discussed in greater detail below. In addition, the first system 110 may also be directly accessible (185), such as for loading of records (e.g., magnetic tape records or other media) for batch processing.

The first system 110 and second system 150 may also be included within or coupled to a larger data communication network 180, through network (or web) server 160, for full duplex communication with remote devices, such as a remote Internet or other network server 170 and remote computer (or other terminal) 175. Such remote communication capability provides for the first system 110 and second system 150 to be accessible for on-line functionality, discussed in greater detail below, such as for web-based access, using any of the prior art protocols, such as hypertext transfer protocol (HTTP) or other Internet Protocol ("IP") forms of communication for data, voice or multimedia.

The data repository (or database) 100, illustrated as databases 100A and 100B, may be embodied in any number of forms, including within any data storage medium, memory device or other storage device, such as a magnetic hard drive, an optical drive, a magnetic disk or tape drive, other machine-readable storage or memory media such as a floppy disk, a CDROM, a CD-RW, DVD or other optical memory, a memory integrated circuit ("IC"), or memory portion of an integrated circuit (such as the resident memory within a processor IC), including without limitation RAM, FLASH, DRAM, SRAM, MRAM, FeRAM, ROM, EPROM or $E^2PROM$, or any other type of memory, storage medium, or data storage apparatus or circuit, which is known or which becomes known, depending upon the selected embodiment.

In the first system 110, the I/O interface may be implemented as known or may become known in the art. The first system 110 and second system 150 further include one or more processors, such as processor 115 illustrated for first system 110. As the term processor is used herein, these implementations may include use of a single integrated circuit ("IC"), or may include use of a plurality of integrated circuits or other components connected, arranged or grouped together, such as microprocessors, digital signal processors ("DSPs"), custom ICs, application specific integrated circuits ("ASICs"), field programmable gate arrays ("FPGAs"), adaptive computing ICs, associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SRAM, MRAM, ROM, EPROM or $E^2PROM$. A processor (such as processor 115), with its associated memory, may be adapted or configured (via programming, FPGA interconnection, or hard-wiring) to perform the methodology of the invention, as discussed above and as further discussed below. For example, the methodology may be programmed and stored, in a processor with its associated memory (and/or memory 120) and other equivalent components, as a set of program instructions (or equivalent configuration or other program) for subsequent execution when the processor is operative (i.e., powered on and functioning). Equivalently, when the first system 110 and second system 150 may implemented in whole or part as FPGAs, custom ICs and/or ASICs, the FPGAs, custom ICs or ASICs also may be designed, configured and/or hard-wired to implement the methodology of the invention. For example, the first system 110 and second system 150 may implemented as an arrangement of microprocessors, DSPs and/or ASICs, collectively referred to as a "processor", which are respectively programmed, designed, adapted or configured to implement the methodology of the invention, in conjunction with one or more databases 100.

The application server 125, database management server 140, and the system 110 may be implemented using any form of server, computer, workstation, or other computational device as known or may become known in the art, such as a server or other computing device having a processor, microprocessor, controller, digital signal processor ("DSP"), adaptive computing circuit, or other integrated circuit programmed or configured to perform the methodology of the present invention, such as a processor 115, as discussed in greater detail below.

An exemplary one or more data repositories (or databases) 100, in accordance with the present invention, contains survey data 180, public data 185, and historical and synthetic data 190, which themselves may be in the form of one or more relations and/or databases (as illustrated). In addition, exemplary databases 100 may contain the results of the method of the invention, as a data structure, discussed below. As mentioned above, "data repository" as used herein, is considered interchangeable with "database" and "data warehouse", and may be relational, object-oriented, or object-relational, or utilize any other database structure, in accordance with a selected embodiment. The database 100 may be integrated, namely, that the information resides within a singular, co-located or otherwise centralized database structure or schema, or may be a distributed database, with information distributed between and among a plurality of databases, some of which may be remotely located from the other databases. From another point of view, the database 100 may be considered integrated in that a plurality of different tables or types of tables, objects or relations are included within the database 100. (Use of any type of data repository, whether an integrated database, a non-integrated database, or any otherwise distributed or non-distributed database structures or schemas, are within the scope of the present invention. While referred to as tables, it should be understood that any such tables are to be construed broadly, to mean and include relations, objects, object relations, multidimensional relations, cubes, stars, snowflakes, flat files, or other similar or equivalent database constructs.)

The one or more databases 100, which provide the data (or variables) for the method of the invention, include survey data 180, public data 185, and historical and synthetic data 190, each of which may be embodied as integrated or separate databases, relations, or tables. In the exemplary embodiments, survey data 180 is empirical information derived from surveys having sufficient sample sizes to support statistical inferences, such as the Simmons National Consumer Survey (NCS), a Nielsen television viewing survey, or any other selected survey or other data source, depending upon the type of information sought to be projected, to support statistical inferences, into regions having insufficient sample size. Public data 185 may be any type or kind of data publicly available, such as census data, CDC (Centers for Disease Control) data, or other data collections (e.g., data collected by various political and religious organizations, such as the Association of Statisticians of American Religious Bodies). Historical and synthetic data 190 may include any other type of data or information, such as past survey information (e.g., past NCS data), or information available only for comparatively larger geographic regions, such as county-level or state-level information (in comparison to the subregion and regional demarcations of the exemplary embodiments of the present invention). Public data 185 and historical and synthetic data 190 may also be considered to be the same group or type of data, as divisions between them may be blurred. Other types of data which may be included in these various databases 180, 185 and/or 190, as examples, also include geographic data, election data, map information, and data from other sources, such as InfoUSA. The various embodiments of the invention support the use of any suitable or appropriate information (variables) which has sufficient discriminatory power to profile a geographic region for projecting other information, to support statistical inferences, into regions having insufficient sample size.

As indicated above, the exemplary embodiments utilize current and historical NCS data, census data, CDC data, and other reasonably available public information. From this data, a plurality of selected variables are obtained and utilized to profile geographic regions, while remaining variables may then be utilized to characterize and provide statistical inferences, as discussed in greater detail below.

Figure 2A:
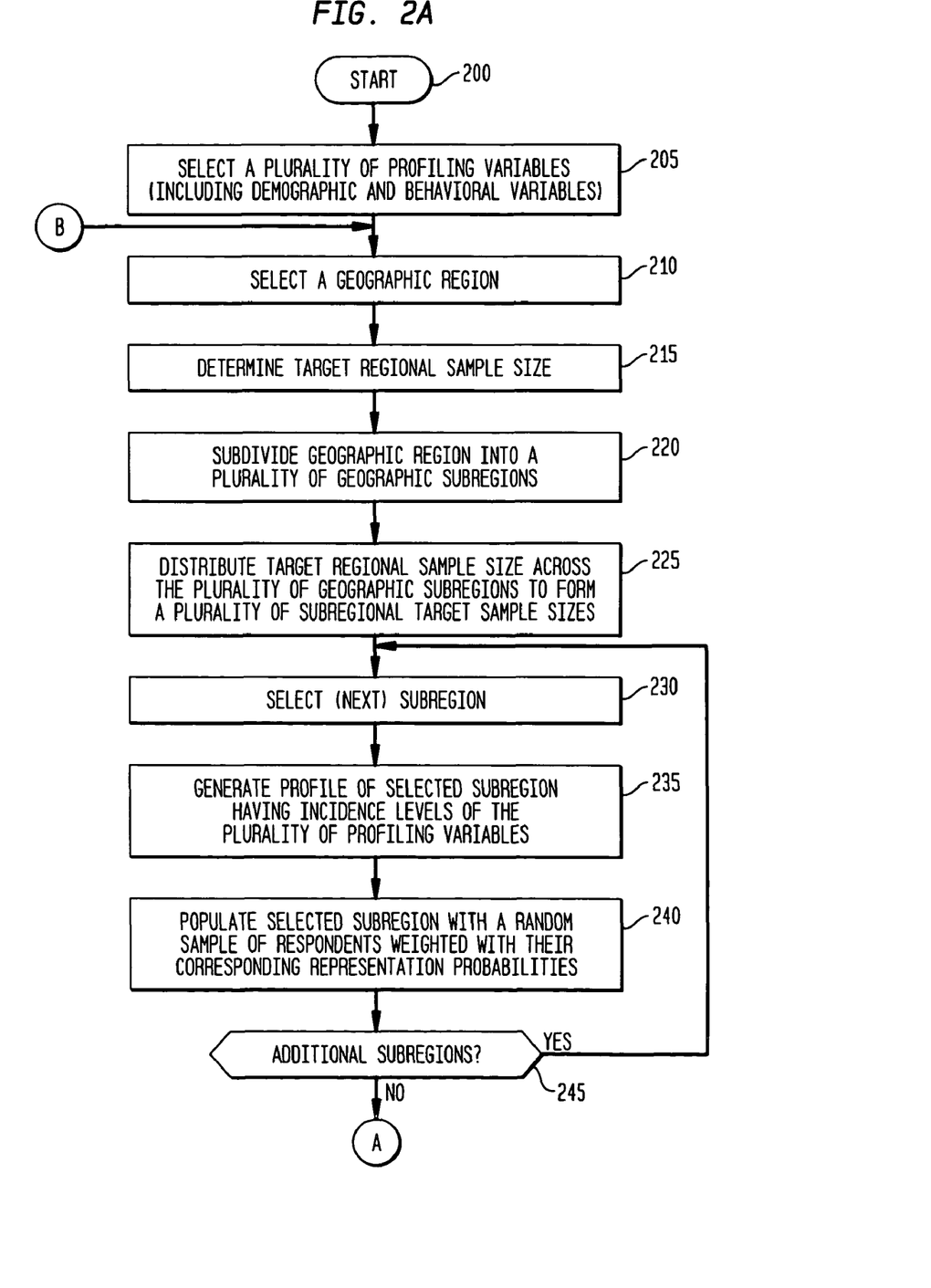
FIGS. 2a-2b (or "FIG. 2a" and "FIG. 2b") are flow diagrams illustrating an exemplary method of projecting information, to support statistical inferences, into regions having insufficient sample size, in accordance with the teachings of the present invention.
Figure 2B:
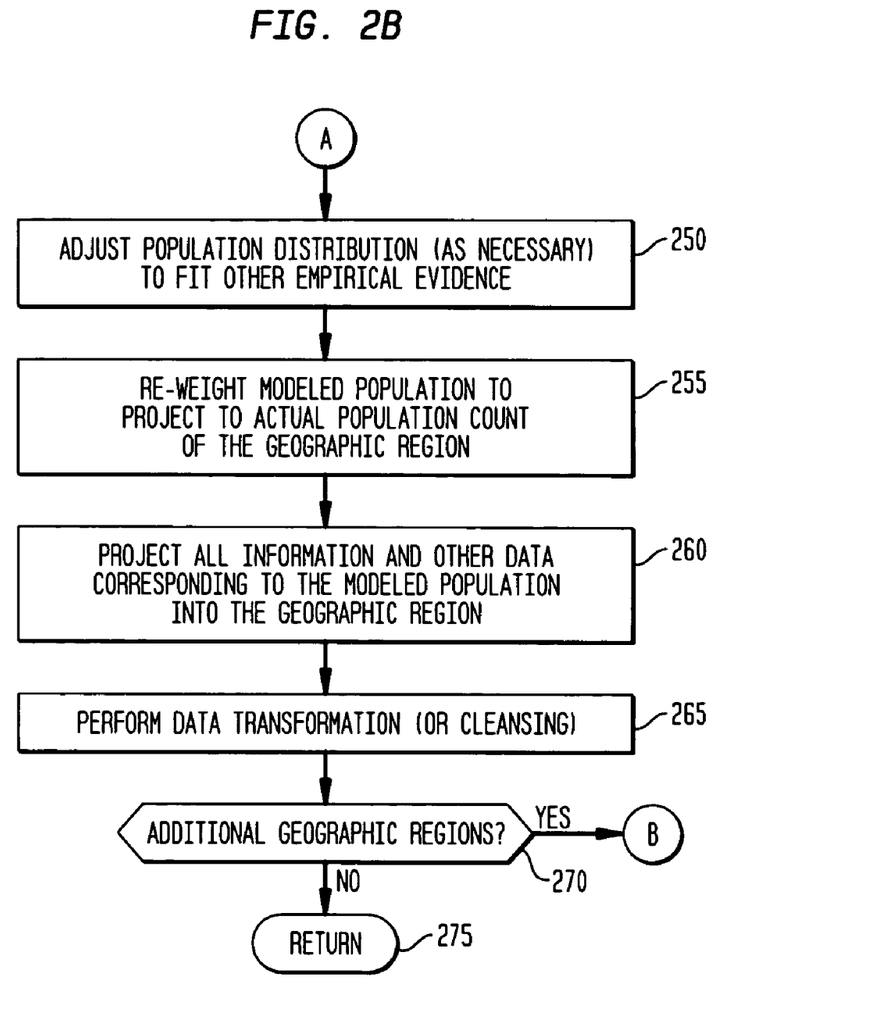

FIG. 2 (or "FIG. 2") is a flow diagram illustrating an exemplary method of projecting information, to support statistical inferences, into regions having insufficient sample size, in accordance with the teachings of the present invention. The method begins, start step 200, and profiling variables are selected, step 205. In the exemplary embodiment, the incidence levels for or occurrence of each of the profiling variables may be empirically determined, such as through survey research, census data, and so on. Also in the exemplary embodiment, approximately one hundred forty profiling variables are utilized currently, and include demographic variables, behavioral variables, cultural, and attitudinal variables, from the various data sources discussed above (survey data 180, public data 185, historical and synthetic data 190), such as the NCS, census and CDC data.

In various embodiments, the profiling variables may be predetermined prior to start step 200, particularly when repeatedly used over time for ongoing profiling (and repeated iterations over time of the method of the invention); in that event, step 205 may be omitted from the particular iteration of the illustrated method. For example, a set of profiling variables may be determined once, with that set of profiling variables repeatedly used in the method, such as in six month or annual intervals, to provide updated projected or modeled information.

In addition, as yet another advantage of the various embodiments, the plurality of profiling variables may be changed dynamically over time, both with regard to which variables are selected substantively, and the number of demographic and behavioral variables utilized. As a consequence, the plurality of profiling variables may be selected and varied over time, such as selecting variables with increasing discriminatory power and effectiveness for a selected time period, for continual improvement and temporal relevance of the inventive methodology. For example, the plurality of profiling variables will tend to vary with the questions posed to respondents and empirical evidence received from the various nationally representative surveys, census data, CDC data, etc., and may be expanded upon or improved as more or new data becomes available.

The profiling variables of the exemplary embodiments include, without limitation, exemplary demographic-oriented variables such as: age, gender, household income, household size, children present in the household, education, race, ethnicity (and further may be duplicated and divided into ethnicity classifications such as Hispanic and non Hispanic (as provided in U.S. census data)), heritage (e.g., Hispanic countries of origin, U.S. born, etc.). It will be understood to those of skill in the art that these variables are further divided into ranges where applicable, such as a plurality of age ranges, a plurality of income ranges, a plurality of education ranges (e.g., secondary, some college, college graduate, graduate school, graduate degree).

The profiling variables of the exemplary embodiments further include, without limitation, exemplary behavioral and attitudinal-oriented variables such as, for example: physical exercise proclivities, investment ownership, mail and telephone ordering (for product or service purchasing), domestic and foreign travel, internet and television cable (broadband) usage, selected product and brand usage, mobile communication usage, political outlook and voting behaviors, household ownership, selected media usage (e.g., broadcast, book, periodical usage), pet ownership, personal care and consumption behaviors, risk-taking behaviors, religious affiliations and practices, and transportation types and usage. In addition, to incorporate timing (or recency) information, another exemplary variable is included to determine whether a respondent is in the most recent survey or a past (historical) survey (of survey data 180 or historical data 190).

It will be understood by those of skill in the survey, research and/or statistical arts that a wide variety of demographic, attitudinal and/or behavioral profiling variables may be utilized, and all of which are considered equivalent and within the scope of the present invention. For purposes of the present invention, it is sufficient that some form of one or more behavioral variables are included among the selected profiling variables. In addition, those of skill will recognize that these variables may be represented in a wide variety of forms, such as binary, by degree or incidence level (e.g., percentages), all of which are equivalent and within the scope of the present invention.

Continuing to refer to FIG. 2, a geographic region is selected, step 210, which is the geographic region into which information will be projected to support statistical inferences, and which generally has an insufficient, actual sample size from any selected survey, such as insufficient representation within the NCS or other behavioral survey. For example, a geographic region may be a major or secondary metropolitan area, a primary or secondary marketing area, a selected designated marketing area ("DMA"), an individual state, and so on. For example, a selected geographic region may include a three county area around Miami, Fla. (as a DMA), an entire state having a comparatively lesser population (e.g., Montana), a French province, a London borough, Tuscany, Singapore, etc. Following determination of the selected geographic region, a first, regional target sample size is selected, step 215. Such a regional target sample size should be sufficiently large to support any selected inference, depending upon the nature of the inference. For example, a smaller target sample size (e.g., 8,000) may be sufficient for inferences about television viewing, while larger target sample sizes may be required for more detailed or complicated inferences, such as pharmaceutical usage.

The selected geographic region is then subdivided into a plurality of subregions, corresponding to any selected level of granularity, step 220. In the various exemplary embodiments, the plurality of subregions correspond to U.S. census block groups; in other embodiments, other subunits may be selected, such as census blocks, postal codes, or other regions provided in empirical data (such as census or demographic surveys) pertinent to the geographic region. Again, the subregion selection will correspond to the selected purposes for the projected information, with corresponding granularity. For example, for some purposes, postal code subregions may be sufficient, while for others, such as retail store location selection, census block or census block group may be desirable. Following the subregion determination, the first, regional target sample size is distributed across each of the plurality of subregions, step 225, to form a corresponding plurality of second, subregional target sample sizes. In the exemplary embodiment, the target sample size is distributed proportionally to actual population levels, with adjustment provided for lower population subregions (i.e., to allow oversampling in certain subregions, so no subregion will have zero or otherwise insufficient sample sizes to support corresponding inferences). These regional and subregional target sample sizes will be referred to as target "inferential" sample sizes, to differentiate them from other target sample sizes utilized in the profiling process (FIG. 3, the target profile (or profiling) sample sizes).

Figure 3:
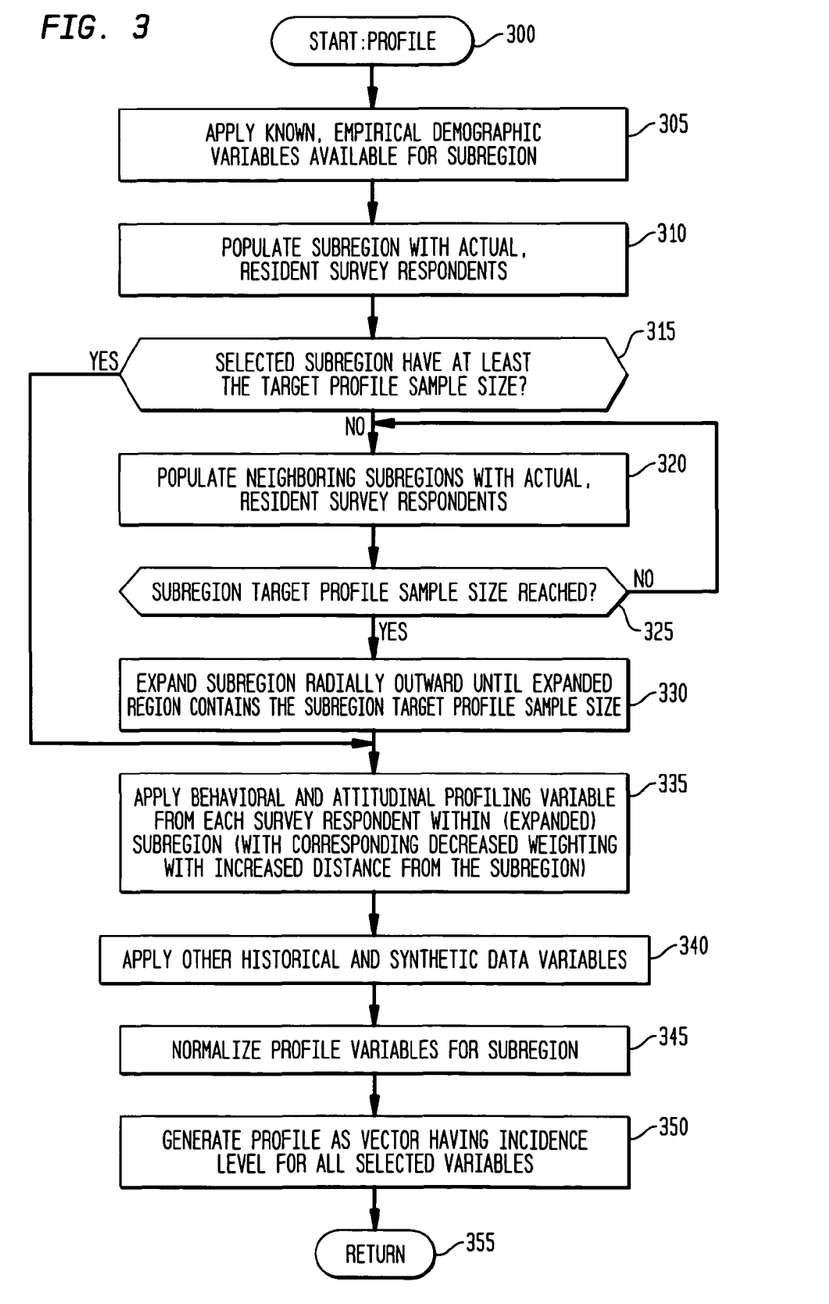
FIG. 3 (or "FIG. 3") is a flow diagram illustrating an exemplary method of subregion profiling in accordance with the teachings of the present invention.

A particular subregion is then selected, such as a particular census block group, step 230. Using the plurality of profiling variables, a corresponding subregion profile is generated, step 235, generally as a vector containing incidence levels for each of the plurality of profiling variables. FIG. 3 (or "FIG. 3") is a flow diagram illustrating an exemplary method of subregion profiling in accordance with the teachings of the present invention. Referring to FIG. 3, the profiling method begins, start step 300, with application and combination of (e.g., determination of a (weighted) average of) any and all selected, empirically determined demographic profiling variables which are available for the selected subregion, such as census demographic profiling variables discussed above, step 305. For example, a weighted average may be determined for each demographic variable of the plurality of profiling variables for the selected subregion, providing a plurality of demographic variables for use in the resulting profile (steps 345 and/or 350). As such information is directly available, as empirical information, such information does not require further modeling in accordance with the exemplary embodiments of the present invention. (In the event such demographic information were not directly available for the selected subregion, such demographic variables of the plurality of profiling variables could be modeled with the remaining plurality of profiling variables, discussed below with respect to steps 310-335).

Next, the subregion is "populated" with actual survey respondents residing in the selected subregion (e.g., from survey data 180 and/or historical data 190), assigning resident survey respondents to the subregion, step 310, and if the number of actual, resident survey respondents meets or exceeds a predetermined subregion profile target sample size, step 315, the method proceeds to step 335 (as also not requiring further modeling, described below). The subregion profile target sample size may be selected based on a wide variety of criteria, and may be limited based on the actual, available population of the selected region. In various cases, the subregion target profile sample size could also be the same as the inferential target sample size for the selected subregion.

As the selected region being modeled generally has an insufficient sample size, it is more likely that the selected subregion does not, in fact, have a sufficient number of actual residents from survey data 180 and/or historical data 190. Accordingly, if the number of actual resident survey respondents resident in the subregion does not meet or exceed the subregion target profile sample size in step 315, the exemplary method proceeds to step 320, and provides an imputed (i.e., projected or virtual) population from neighboring subregions, to thereby provide modeled data from a sufficient sample size. More specifically, in step 320, the exemplary method populates the corresponding plurality of neighboring subregions (both adjacent (nearest) neighbors and successively adjacent neighboring subregions (neighbors of neighbors) with actual survey respondents residing in those corresponding neighboring subregions (e.g., also from survey data 180 and/or historical data 190). Step 320 continues until the subregion target profile sample size has been reached, step 325.

Figure 4:
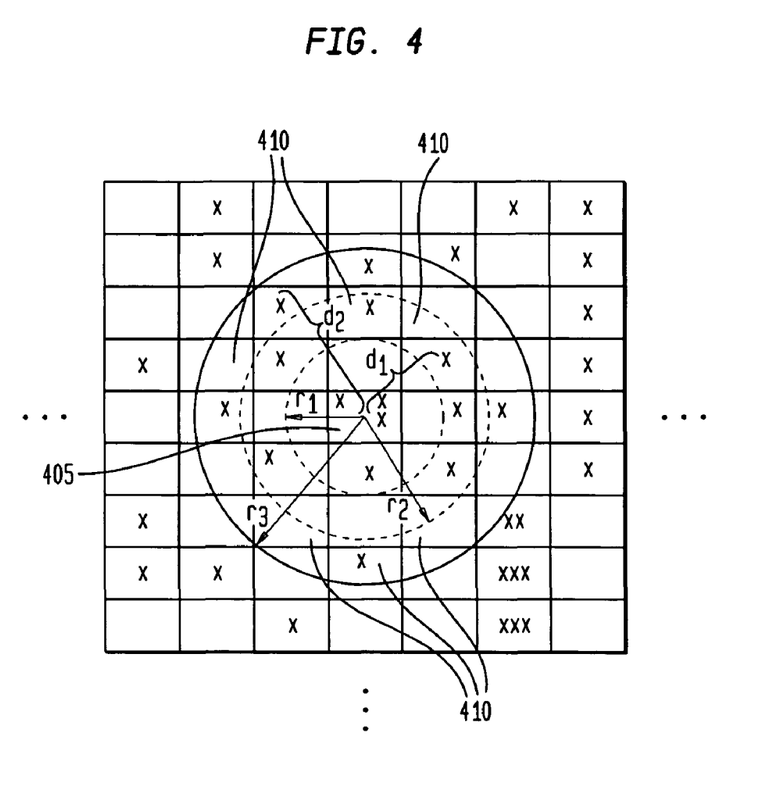
FIG. 4 (or "FIG. 4") is a diagram illustrating weighted spatial estimation for subregion profile determination in accordance with the teachings of the present invention.

As the subregion target profile sample size may also have been (slightly) exceeded through successive population of neighboring subregions, and further, to support increased accuracy even when the inclusion process has not exceeded the target profile sample size, in step 330, the imputed population of the subregion which will be utilized in the profile modeling is determined by moving radially outward from the approximate (or substantial) center of the selected subregion, effectively expanding the selected subregion until the circular, expanded geographic region contains the subregion target sample size of both actual residents and neighboring residents (forming the imputed population), as illustrated in FIG. 4. As discussed in greater detail below, however, different weightings will then be applied to the plurality of profiling variables from the imputed population, compared to the actual population, of the selected subregion.

Following steps 315 or 330, in step 335, each of the behavioral and attitudinal profiling variables are applied and combined, such as by forming weighted averages of each such behavioral and attitudinal profiling variable, as part of the determination of the subregion profile. In the event that demographic profiling variables were not available independently for the selected subregion in step 305, those variables would also be included in step 335. The plurality of behavioral and attitudinal (and possibly demographic) profiling variables for the actual subregion population are provided with full weighting, with lesser weighting provided for the corresponding plurality of profiling variables of the imputed population. More specifically, all corresponding profiling variables of the imputed population are given a decreasing weight with increasing distance from the approximate center of the selected subregion (i.e., weighted inversely proportionally to increasing distance). Such a weighting, as a decreasing or decaying function with increasing distance, may be linear or nonlinear (e.g., linearly decreasing, exponentially decaying, hyperbolically decaying, etc.), depending upon the selected embodiment.

FIG. 4 (or "FIG. 4") is a diagram illustrating such weighted spatial estimation for subregion profile determination in accordance with the teachings of the present invention. As illustrated in FIG. 4, the selected subregion 405 contains 300 residents from the (behavioral) survey data 180 and/or historical data 190 (with each "X" equal to 100 residents), while the target subregion population for profiling is 1500 persons. Neighboring subregions 410 are populated by corresponding residents (from survey data 180); moving radially outward (radii $r_1$, $r_2$ and $r_3$), successively larger regions (with more neighboring subregions 410) are included, until the subregion target sample size has been reached (indicated by the circle having radius $r_3$, containing an additional 12 Xs). The profiling variables from the imputed population, i.e., from those residing in the neighboring subregions, are provided with lesser weighting, inversely proportional to increasing distance. For example, the plurality of profiling variables of the imputed population at a distance of $d_2$ are given comparatively less weight in the resulting subregion profile than the plurality of profiling variables of the imputed population at a distance of $d_1$, which, in turn, are given comparatively less weight in the resulting subregion profile than the plurality of profiling variables of the actual population of the selected subregion 405.

Referring again to FIG. 3, following step 335, any variables of the plurality of profiling variables from historical and synthetic data 190 are applied to and combined to form a portion of the subregion profile, also such as a weighted average of each such variable, step 340. When historical data (such as previous surveys) has already been utilized in the previous steps, in the event that the selected embodiment does not have additional historical or synthetic data available, step 340 may be omitted. The combined plurality of profiling variables (e.g., corresponding weighted averages for each profiling variable of the plurality of profiling variables) including demographic variables available for the subregion, from step 305, behavioral and attitudinal variables from step 335, and any historical or synthetic variables from step 340, are then adjusted or normalized using other applicable independent data, such as other or additional historical or synthetic data 190, in step 345. For example, the resulting profiles of a plurality of subregions may be normalized to data available on a larger geographic scope (e.g., county or city data), such as racial or religious affiliation data. Following step 345, the profile of the selected subregion is generated, step 350, such as a vector having incidence levels for all variables of the plurality of profiling variables, and the subregion profiling may end, return step 355. For example, the resulting profile may have, for each profiling variable of the plurality of profiling variables, a normalized, weighted average for such variable derived from the various data sources (180, 185 and 190), which may have been determined directly (e.g., step 305 and data from actual subregion residents in step 335) or modeled using imputed residents. It should be noted that other methods, in addition to weighted averaging, may be utilized to provide the incidence levels of the plurality of profiling variables, such as other mean values, mode values, median values, and so on, and all such methods are considered equivalent and are within the scope of the present invention. For example, a value for a given variable may be based on an average determined without a certain level of outliers, such as excluding results having a larger, predetermined deviation from the mean.

Figure 5:
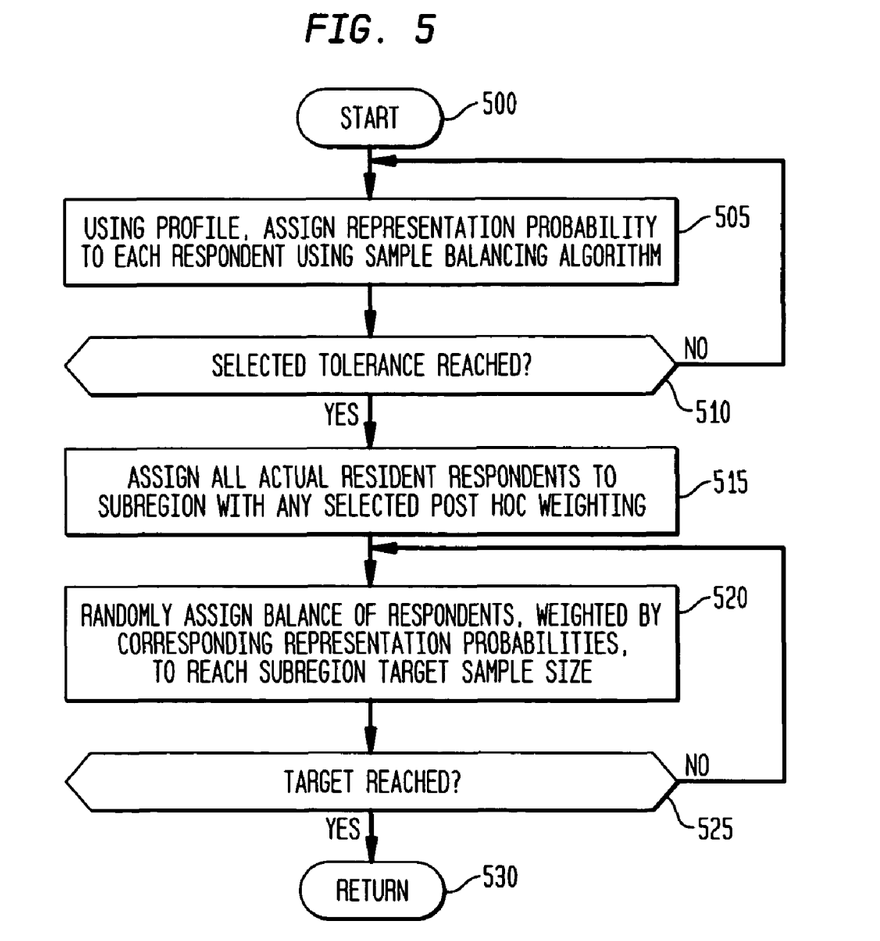
FIG. 5 (or "FIG. 5") is a flow diagram illustrating an exemplary method of subregion modeled population assignment in accordance with the teachings of the present invention.

Referring again to FIG. 2, following generation of the selected subregion profile, such as the subregion vector providing an incidence level for each profiling variable of the plurality of profiling variables, the corresponding subregion is populated by a random sample of respondents (from survey data 180) weighted by their corresponding probability of representing the selected subregion based on the profile of the selected subregion, step 240. FIG. 5 (or "FIG. 5") is a flow diagram illustrating an exemplary method of subregion population assignment in accordance with the teachings of the present invention.

Each survey respondent (of survey data 180), such as each of 25,000 survey respondents of the NCS, is effectively "scored" against the selected subregion profile, generating a value indicative of a probability of that survey respondent "belonging to" or residing in the selected subregion, i.e., a likelihood that the particular respondent is representative of those residing in the selected subregion, which may be referred to as a "representation probability". For example, a respondent from San Diego, Calif. will be scored against a profile representing Lincoln, Nebr., to determine the likelihood that the San Diego respondent "looks like" they would or could live in Lincoln and accurately reflect the residents of Lincoln based on not only demographics, but also representative behaviors and attitudes, based on a comparison (discussed below) of their values for the plurality of profiling variables with the incidence levels for each of the plurality of profiling variables for, in this example, the Lincoln, Nebr. region. Based on such scoring, the selected subregion will be assigned a group of individuals as representative of the subregion, as step 240, sufficient to provide the target inferential sample size.

Referring to FIG. 5, beginning with start step 500, a modeled population of a predetermined size (with each of their corresponding values for the plurality of profiling variables) will be assigned (projected or imputed) to the selected subregion, to ultimately provide the projected information for the subregion. The predetermined size of the modeled population was determined from the distribution of the regional target inferential sample size into the various subregions in step 225, above, namely, the corresponding subregional target inferential sample size. Using the subregion profile (e.g., resulting subregion vector having incidence levels of the plurality of profiling variables), and using a matrix or other tabulation of survey respondents with each of their values for the plurality of profiling variables, the method utilizes a sample balancing algorithm (as known in the various statistical arts) to assign a probability or other score to each survey respondent, to a selected or otherwise predetermined tolerance or discrepancy level, step 505. This is typically an iterative process, for each profiling variable of the plurality of profiling variables, across each respondent, to arrive at a probability for each respondent based on the profile of the selected subregion, i.e., to determine their "representation probability".

When the accepted or selected tolerance (or stability) level from the application of the sample balancing algorithm is reached, step 510, the method proceeds to assign respondents to the selected subregion. First, any and all respondents actually residing in the selected subregion are assigned, with any selected or predetermined post hoc weighting, step 515. For example, the resulting modeled population of the selected subregion may have not only the plurality of profiling variables, but also the balance of the corresponding information from the survey data 180, provided with an increased weighting based on being from one or more actual, resident individual respondents. It will be understood that step 515 may occur in the assignment method in a wide variety of orders, such as preceding step 505.

Next, in step 520, the balance of the subregion target inferential sample size is determined by randomly assigning individual respondents weighted with their corresponding probabilities (scores), such that individuals having a higher probability of being representative of the selected subregion have a correspondingly higher probability of being selected in the random selection and assignment. For example, numerical ranges may be assigned to each respondent, with each range proportional to their individual probability; upon generation of a random number, there is a higher probability that the random number will fall in the larger ranges, increasing the probability that those individuals will be selected for inclusion in the modeled population. In addition, such probabilities included weighting from a recency or timing variable, such that those individuals from more recent surveys have a higher probability of being selected in the modeled population. In the selected embodiments, generally about fifty percent of the balance of the subregion target inferential sample size (following assignment of actual residents) are individual respondents from any most recent survey (of survey data 180), while the remaining fifty percent are from the next most recent survey (e.g., from historical data 190), so that the modeled population is current and not temporally skewed. When the subregion target inferential sample size has been reached, step 525, the modeled population assignment for the selected subregion may end, return step 530.

This random assignment of survey respondents weighted by their corresponding subregion profile probabilities is very important, and one of the highly novel features of the present invention, as it preserves nuances and minority representation, such as minority representation based on race, ethnicity, political outlook, education, purchase behavior, etc. Prior art methods using clustering and/or other segmentation methods lose this subtle but valuable information, as such minority populations are not included in the assigned clusters. For example, in a subregion which is 96% white non-Hispanic, and 4% black, if assignments were based on prior art clustering, or only based on the profile probabilities without the randomization, the resulting inferential sample population would be skewed to be virtually 100% white, as they have the higher probabilities of representing the subregion population. In contrast, the random assignment of survey respondents weighted by their corresponding subregion profile probabilities, in accordance with the exemplary embodiments, preserves the full spectrum of information representative of each subregion. As a consequence, the methodology of the invention provides a considerably more accurate and representative modeling of regions, compared to prior art methods.

Referring again to FIG. 2, following steps 235 and 240, a selected subregion has been profiled, and populated with survey respondents (from any region) based on a random assignment weighted by their corresponding subregion profile probabilities, providing a representative population meeting the subregion target inferential sample size. This process then repeats, returning to step 230 to select the next subregion of the selected geographic region, profile the next selected subregion, and populate it with survey respondents, step 245, until all subregions of the selected geographic region have been profiled and provided with their modeled population. It should be noted that the various profiling, scoring, and random assignment processes illustrated in FIGS. 3-5 are repeated de novo for each selected subregion. These de novo determinations provide increased modeling accuracy, as any given subregion may differ significantly from other subregions within the selected geographic region, so that the probability of an individual representing a given subregion does not carry over to be an equivalent probability of representing another subregion.

Following step 245, the selected geographic subregion now has a modeled population meeting the target inferential sample size. In the event of any discrepancies with empirical data (such as census data, from public data 185), the distribution and/or weighting of the modeled population may be adjusted, as may be necessary, to fit such empirical evidence, step 250, with potential re-weighting as the modeled population is then further projected to a total count representing the actual population of the selected geographic region, step 255. Such re-weighting will generally be flat, as the sample was engineered to reflect such data. For example, however, in the event the randomization actually resulted in a modeled population having insufficient minority or majority representation, the modeled population may be adjusted or renormalized in steps 250 and 255, for increased accuracy.

Based on the modeled population, all information and other data corresponding to the modeled population is now projected or assigned to the selected geographic region, step 260. For example, while profiling in the exemplary embodiments used approximately 140 variables, survey data 180 may have considerably more information available, such as over 50,000 information items for each of 25,000 respondents of the NCS survey. For accurate or realistic comparisons, certain projected data is also "cleansed" or transformed, to provide for regional and subregional comparisons, step 265, such as employing such data transformation to provide a basis for comparisons for local or regional retail establishments. For example, to avoid confusion, a survey respondent from Florida, used in the modeled population of Lincoln, Nebr., may have transformed data concerning selected grocery stores, such that the Lincoln data does not indicate an individual driving 1,000 miles to a Florida grocery store every week, when the Florida individual actually drives 2 miles to their local store. Similarly, other geographically specific or peculiar information may also be transformed, such as newspaper and magazine selection (e.g., such that the projected information for Lincoln residents is not skewed by an individual of the modeled population who reads the Miami Herald). This process (steps 205-265 and FIGS. 3-5) is then repeated for each selected geographic region, step 270, until all selected geographic regions have been modeled, and the method may end, return step 275. In the Simmons LOCAL product, the entire U.S. is modeled, region by region, using all available data from Simmons NCS.

Using the modeled population, the selected geographic region now has a wealth of information, including nuanced and minority information, which may be utilized to draw statistical inferences, for a geographic region which otherwise had an insufficient sample size to legitimately support such statistical analyses. For example, brand usage may be determined, based on tracking over 8,000 brands in the NCS. Other behaviors and attitudes, and not just demographics, may also be analyzed for a wide variety of purposes, from political measurements to media consumption. As a consequence, in accordance with the present invention, nationally representative survey results may be projected into various regions and subregions, accurately, and without any need for conducting separate surveys in these regions and subregions. In addition, while various examples have been discussed with respect to the United States, it will be understood to those of skill in the art that the method, systems and software in accordance with the exemplary embodiments of the present invention are applicable to any geographic region worldwide.

It will be further understood by those of skill in the art that the present invention may be embodied in a wide variety of forms. As indicated above, the system of the present invention generally comprises a memory storing a data repository (or database) 100 and a processor, such as a processor 115 included within a mainframe or workstation computer of system 110 or within either (or both) a database management server 140 or an application server 125 of system 150. The processor is programmed to perform the methodology of the present invention. As a consequence, the system and method of the present invention may be embodied as software which provides such programming.

More generally, the system, methods and programs of the present invention may be embodied in any number of forms, such as within any type of computer, within a workstation, within an application server such as application server 125, within a database management server 140, within a computer network, within an adaptive computing device, or within any other form of computing or other system used to create or contain source code. Such source code further may be compiled into some form of instructions or object code (including assembly language instructions or configuration information). The software or source code of the present invention may be embodied as any type of source code, such as SQL and its variations (e.g., SQL 99 or successor or proprietary versions of SQL), C, C++, Java, or any other type of programming language which performs the functionality discussed above. As a consequence, a "construct" or "program construct", as used herein, means and refers to any programming language, of any kind, with any syntax or signatures, which provides or can be interpreted to provide the associated functionality or methodology (when instantiated or loaded into a server or other computing device).

The software or other code of the present invention, such as any resulting or compiled bit file (object code or configuration bit sequence), may be embodied within any tangible storage medium, such as within a memory or storage device for use by a computer, a workstation, any other machine-readable medium or form, or any other storage form or medium for use in a computing system. Such storage medium, memory or other storage devices may be any type of memory device, memory integrated circuit ("IC"), or memory portion of an integrated circuit (such as the resident memory within a processor IC), including without limitation RAM, FLASH, DRAM, SRAM, MRAM, FeRAM, ROM, EPROM or $E^2$PROM, or any other type of memory, storage medium, or data storage apparatus or circuit, depending upon the selected embodiment. For example, without limitation, a tangible medium storing computer readable software, or other machine-readable medium, may include a floppy disk, a CDROM, a CD-RW, a magnetic hard drive, an optical drive, a quantum computing storage medium or device, a transmitted electromagnetic signal (e.g., used in internet downloading), or any other type of data storage apparatus or medium.

The results, information and other data provided by the system, methods and programs of the present invention also may be embodied as a data structure and stored or provided in any number of forms and media, such as a data structure stored within any type of computer, within a workstation, within an application server such as application server 125, within a database management server 140, within a computer network, within a database 100, within an adaptive computing device, or within any form of memory, storage device, or machine-readable media, as discussed above. In accordance with the present invention, such a data structure is comprised of a plurality of fields, containing information provided from the method, system or software of the present invention, such as survey results from the modeled population of a selected geographic region, and inferences drawn from the modeled population of a selected geographic region.

A wide variety of selections of which fields are included in the data structure and the ordering of these various selected fields are available, as will be apparent to those of skill in the art, and are within the scope of the invention. In addition, this data structure embodiment may be housed, embodied, or stored in myriad orders and locations, such as different memory locations as directed by a DMA engine or memory address generator, for example. The data structure of the present invention may also be embodied, stored, distributed or communicated in a wide variety of forms, such as electronically (e.g., internet, wireless, email, storage disk), or through various print media, for example, such as in the form of a market research report.

For example, the method, system and software embodiments may also output a data structure, containing both "in-tab" information, such as the number of respondents placed within a region or subregion, and "cross-tab" information, such as a display of a correlation or other relationship between one or more variables. Such a data structure may take on a wide variety of forms, such as graphical or text (e.g., bar and pie charts, to text descriptions) and apply a wide variety of statistical tests, such as chi-square or simple determinations of mean, median and mode. In addition, the data structure may take the form of a geographic map, with mapping to attitudinal, behavioral and/or demographic information, and output with any selected geographic areas, such as by state, city, county, census block, and so on.

Numerous advantages of the present invention are readily apparent. The various embodiments of the present invention provide for accurate modeling of geographic regions which would otherwise have an insufficient sample size to support statistical inferences. The various embodiments of the present invention preserve nuances and minority representation, such as minority representation based on race, ethnicity, political outlook, education, purchase behavior, etc., where prior art clustering and/or segmentation methods lose this subtle but valuable information, as such minority populations are not included in the assigned clusters. In accordance with the exemplary embodiments, the present invention preserves the full spectrum of information representative of each subregion. As a consequence, the methodology of the invention provides a considerably more accurate and representative modeling of regions, compared to prior art methods.

Using the modeled population of the present invention, the selected geographic region now has a wealth of information, including nuanced and minority information, which may be utilized to draw statistical inferences, for a geographic region which otherwise had an insufficient sample size to legitimately support such statistical analyses. In addition, the additional data transformation of the present invention provides the capability for regional comparisons. In accordance with the present invention, therefore, nationally representative survey results may be projected into various regions and subregions, accurately, and without any need for conducting separate surveys in these regions and subregions.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A computer-implemented method for projecting survey information into a geographic region, the geographic region having a plurality of geographic subregions, the method comprising:
    using a processing device, profiling people resident in a selected geographic subregion of the plurality of geographic subregions using a plurality of profiling variables to form a selected geographic subregion population profile;
    using a processing device, determining a representation probability for each non-resident survey respondent of a plurality of survey respondents by applying a sample balancing algorithm to each profiling variable of the plurality of profiling variables of each non-resident survey respondent in comparison to the selected geographic subregion population profile;
    using a processing device, virtually and randomly assigning a first plurality of non-resident survey respondents, of the plurality of survey respondents, into the selected geographic subregion to model a population of the selected geographic subregion, the random assignment weighted based on the representation probability of each non-resident survey respondent of the plurality of survey respondents for the selected geographic subregion;
    using a processing device, repeating the profiling, representation probability determination and random assignment for all geographic subregions of the plurality of geographic subregions; and
    using a processing device, projecting the survey information of the randomly assigned first plurality of non-resident survey respondents into the geographic region to characterize the population of the geographic region.

2. The computer-implemented method of claim 1, wherein the plurality of profiling variables further comprise a plurality of demographic variables and a plurality of behavioral variables.

3. The computer-implemented method of claim 2, wherein the plurality of profiling variables further comprise a plurality of historical variables.

4. The computer-implemented method of claim 1, wherein the profiling step further comprises:
    using a processing device, determining a first portion of the selected geographic subregion population profile based upon demographic variables determined for the residents of the selected geographic subregion.

5. The computer-implemented method of claim 4, wherein the profiling step further comprises:
    using a processing device, virtually assigning a second plurality of non-resident survey respondents of the plurality of survey respondents to the selected geographic subregion, the second plurality of non-resident survey respondents resident in a plurality of neighboring geographic subregions; and
    using a processing device, determining a second portion of the selected geographic subregion population profile as a weighted average of the plurality of profiling variables of a plurality of resident survey respondents of the plurality of survey respondents and the plurality of profiling variables of the second plurality of non-resident survey respondents.

6. The computer-implemented method of claim 5, wherein the plurality of profiling variables of the second plurality of non-resident survey respondents are each weighted inversely proportionally to a distance of a non-resident survey respondent from the selected geographic subregion.

7. The computer-implemented method of claim 5, wherein the selected geographic subregion population profile is further determined by normalizing the weighted average of the pluralities of profiling variables based on independent data for the resident population of the selected geographic subregion or geographic region.

8. The computer-implemented method of claim 1, wherein the sample balancing algorithm provides a type of comparison of the values of the plurality of profiling variables of each non-resident survey respondent with the incidence levels of the plurality of profiling variables in the selected geographic subregion.

9. The computer-implemented method of claim 1, wherein the plurality of profiling variables of the plurality of survey respondents further comprise a temporal weighting.

10. The computer-implemented method of claim 1, wherein the assignment step further comprises:
    using a processing device, deterministically and virtually assigning all resident survey respondents of the plurality of survey respondents to the selected geographic subregion population.

11. The computer-implemented method of claim 1, wherein the projected survey information further comprises transformed data for regional comparison.

12. The computer-implemented method of claim 1, wherein the projected survey information further comprises nationally representative survey information pertaining to one or more types of information selected from the group consisting of: brand usage, age, gender, household income, race, ethnicity, political outlook, education, purchase behavior, media consumption, vehicle information, transportation information, financial information, and combinations thereof.

13. The computer-implemented method of claim 1, further comprising:
using a processing device, providing a data structure containing at least a portion of the survey information corresponding to the geographic region or the selected geographic subregion.

14. The computer-implemented method of claim 13, wherein the data structure has a graphical and textual form.

15. A system for projecting survey information into a geographic region, the geographic region having a plurality of geographic subregions, the system comprising:
a memory storing the survey information; and
a processor coupled to the memory, the processor to form a selected geographic subregion population profile of people resident in the selected geographic subregion, for each selected geographic subregion of the plurality of geographic subregions, using a plurality of profiling variables; to determine a representation probability for each non-resident survey respondent of a plurality of survey respondents by applying a sample balancing algorithm to each profiling variable of the plurality of profiling variables of each non-resident survey respondent in comparison to the selected geographic subregion population profile; to randomly and virtually assign a first plurality of non-resident survey respondents, of the plurality of survey respondents, into each selected geographic subregion to model a population of the selected geographic subregion, the random assignment weighted based on the representation probability of each non-resident survey respondent of the plurality of survey respondents for the selected geographic subregion; and to project the survey information of the randomly assigned first plurality of non-resident survey respondents into the geographic region to characterize the population of the geographic region.

16. The system of claim 15, wherein the plurality of profiling variables further comprise a plurality of demographic variables and a plurality of behavioral variables.

17. The system of claim 16, wherein the plurality of profiling variables further comprise a plurality of historical variables.

18. The system of claim 15, wherein the processor further is to determine a first portion of the selected geographic subregion population profile based upon demographic variables determined for the residents of the selected geographic subregion.

19. The system of claim 18, wherein the processor further is to virtually assign a second plurality of non-resident survey respondents of the plurality of survey respondents to the selected geographic subregion, the second plurality of non-resident survey respondents resident in a plurality of neighboring geographic subregions; and determine a second portion of the selected geographic subregion population profile as a weighted average of the plurality of profiling variables of a plurality of resident survey respondents of the plurality of survey respondents and the plurality of profiling variables of the second plurality of non-resident survey respondents.

20. The system of claim 18, wherein the processor further is to weight each of the plurality of profiling variables of the second plurality of non-resident survey respondents inversely proportionally to a distance of a non-resident survey respondent from the selected geographic subregion.

21. The system of claim 18, wherein the processor further is to determine the selected geographic subregion population profile by normalizing the weighted average of the pluralities of profiling variables based on independent data for the resident population of the selected geographic subregion or geographic region.

22. The system of claim 15, wherein the sample balancing algorithm provides a type of comparison of the values of the plurality of profiling variables of each non-resident survey respondent with the incidence levels of the plurality of profiling variables of the selected geographic subregion.

23. The system of claim 15, wherein the plurality of profiling variables of the plurality of survey respondents further comprise a temporal weighting.

24. The system of claim 15, wherein the processor further is deterministically and virtually assign all resident survey respondents of the plurality of survey respondents to the selected geographic subregion population.

25. The system of claim 15, wherein the processor further is to transform the projected survey information for regional comparison.

26. The system of claim 15, wherein the projected survey information further comprises nationally representative survey information pertaining to one or more types of information selected from the group consisting of: brand usage, age, gender, household income, race, ethnicity, political outlook, education, purchase behavior, media consumption, vehicle information, transportation information, financial information, and combinations thereof.

27. The system of claim 15, wherein the processor further is to provide and to store in the memory a data structure containing at least a portion of the survey information corresponding to the geographic region or the selected geographic subregion.

28. A tangible medium storing computer readable program instructions for execution by a computer system for projecting survey information into a geographic region, the geographic region having a plurality of geographic subregions, the tangible medium storing computer readable program instructions comprising:
a first program construct for profiling people resident in a selected geographic subregion of the plurality of geographic subregions using a plurality of profiling variables to form a selected geographic subregion population profile, for each geographic subregion of the plurality of geographic subregions;
a second program construct for determining a representation probability for each non-resident survey respondent of a plurality of survey respondents by applying a sample balancing algorithm to each profiling variable of the plurality of profiling variables of each non-resident survey respondent in comparison to the selected geographic subregion population profile; and for virtually and randomly assigning a first plurality of non-resident survey respondents, of the plurality of survey respondents, into the selected geographic subregion to model a population of the selected geographic subregion, the random assignment weighted based on the representation probability of each non-resident survey respondent of the plurality of survey respondents for the selected geographic subregion, for each geographic subregion of the plurality of geographic subregions; and
a third program construct for projecting the survey information of the randomly assigned first plurality of non-resident survey respondents into the geographic region to characterize the population of the geographic region.

29. The tangible medium of claim 28, wherein the plurality of profiling variables further comprise a plurality of demographic variables and a plurality of behavioral variables.

30. The tangible medium of claim 29, wherein the plurality of profiling variables further comprise a plurality of historical variables.

31. The tangible medium of claim 28, wherein the first program construct further comprises a fourth program construct for determining a first portion of the selected geographic subregion population profile based upon demographic variables determined for the residents of the selected geographic subregion.

32. The tangible medium of claim 31, wherein the first program construct further comprises a fifth program construct for virtually assigning a second plurality of non-resident survey respondents of the plurality of survey respondents to the selected geographic subregion, the second plurality of non-resident survey respondents resident in a plurality of neighboring geographic subregions; and for determining a second portion of the selected geographic subregion population profile as a weighted average of the plurality of profiling variables of a plurality of resident survey respondents of the plurality of survey respondents and the plurality of profiling variables of the second plurality of non-resident survey respondents.

33. The tangible medium of claim 32, wherein the plurality of profiling variables of the second plurality of non-resident survey respondents are each weighted inversely proportionally to a distance of a non-resident survey respondent from the selected geographic subregion.

34. The tangible medium of claim 32, wherein the fifth program construct further determines the selected geographic subregion population profile by normalizing the weighted average of pluralities of profiling variables based on independent data for the resident population of the selected geographic subregion or geographic region.

35. The tangible medium of claim 28, wherein the sample balancing algorithm provides a type of comparison of the values of the plurality of profiling variables of all each non-resident survey respondent with the incidence levels of the plurality of profiling variables in the selected geographic subregion.

36. The tangible medium of claim 35, wherein the plurality of profiling variables of the plurality of survey respondents further comprise a temporal weighting.

37. The tangible medium of claim 28, wherein the second program construct further assigns deterministically and virtually all resident survey respondents of the plurality of survey respondents to the selected geographic subregion population.

38. The tangible medium of claim 28, wherein the third program construct further transforms data of the projected survey information for regional comparison.

39. The tangible medium of claim 28, wherein the projected survey information further comprises nationally representative survey information pertaining to one or more types of information selected from the group consisting of: brand usage, age, gender, household income, race, ethnicity, political outlook, education, purchase behavior, media consumption, vehicle information, transportation information, financial information, and combinations thereof.

40. A computer-implemented method for obtaining statistically significant information from a geographic region having an insufficient population sample size, the method comprising:

using a processing device, profiling a first plurality of resident survey respondents of a plurality of survey respondents using a plurality of profiling variables, each survey respondent of the first plurality of resident survey respondents resident in a selected geographic region, to form a selected geographic region population profile;

using a processing device, virtually assigning a second plurality of non-resident survey respondents of the plurality of survey respondents to the geographic region, each survey respondent of the second plurality of non-resident survey respondents resident in a neighboring geographic region of the selected geographic region, the plurality of profiling variables of the second plurality of non-resident survey respondents weighted inversely proportionally to a distance of a non-resident survey respondent of the second plurality of survey respondents from the selected geographic region;

using a processing device, determining a representation probability for each non-resident survey respondent of a plurality of survey respondents by applying a sample balancing algorithm to each profiling variable of the plurality of profiling variables of each non-resident survey respondent in comparison to the selected geographic subregion population profile;

using a processing device, virtually and randomly assigning a third plurality of non-resident survey respondents of the plurality of survey respondents into the selected geographic region, the third plurality of non-resident survey respondents resident in any of a plurality of surveyed geographic regions, the random assignment weighted based on the representation probability of each non-resident survey respondent of the plurality of survey respondents for the selected geographic region; and using a processing device, obtaining the statistically significant information for the population of the geographic region using survey information of the first plurality of resident survey respondents, the second plurality of non-resident survey respondents, and the randomly assigned third plurality of non-resident survey respondents.

* * * * *